United States Patent [19]

Eldridge et al.

[11] 4,314,093
[45] Feb. 2, 1982

[54] CABLE CONNECTOR

[75] Inventors: Raymond W. Eldridge; David F. Winter, both of St. Louis, Mo.

[73] Assignee: International Telephone and Telegraph Corporation, New York, N.Y.

[21] Appl. No.: 25,262

[22] Filed: Mar. 29, 1979

[51] Int. Cl.³ .................................... H02G 15/184
[52] U.S. Cl. .................................... 174/73 R; 174/88 C
[58] Field of Search ............ 174/73 R, 73 SC, 84 R, 174/88 C; 339/143 R, 143 C

[56] References Cited

U.S. PATENT DOCUMENTS

| | | | |
|---|---|---|---|
| 1,975,226 | 10/1934 | De Zoeten | 174/73 R |
| 3,344,391 | 9/1967 | Ruete | 174/73 R |
| 3,385,939 | 5/1968 | Jacobs, Jr. | 174/84 R X |
| 3,612,746 | 10/1971 | Sankey | 174/73 R |
| 3,673,311 | 6/1972 | Misare | 174/73 R |
| 4,079,189 | 3/1978 | Troccoli | 174/73 R |
| 4,099,021 | 7/1978 | Venezia | 174/73 R |
| 4,164,620 | 8/1979 | Hervig | 174/73 R |
| 4,168,393 | 9/1979 | Silva | 174/73 R |

*Primary Examiner*—Laramie E. Askin

*Attorney, Agent, or Firm*—James B. Raden; William J. Michals

[57] ABSTRACT

A splice connector for connecting adjacent ends of primary distribution system cables. The connector includes a unitary splice body of molded elastomeric material including a generally longitudinal portion for receiving the cable ends from opposite sides thereof. The assembly includes a semiconductive insert sleeve for surrounding the conductor connection of the cable ends, and a substantially continuous semiconductive outer jacket. The jacket and insert sleeve are separated by a portion of insulating material the axially outer ends of which extend past the ends of the insert sleeve for engaging insulated portions of the cable ends. The insert sleeve is provided with a plurality of axially and circumferentially extending and radially inwardly directed protuberances which yieldably engage the crimped connection of the cable conductors. The ends of the jacket include similar protuberances which engage the conductive jacket portions of the cable. The protuberances are yieldable so as to facilitate assembly of the splice body onto the prepared cable ends during installation of the connector.

3 Claims, 9 Drawing Figures

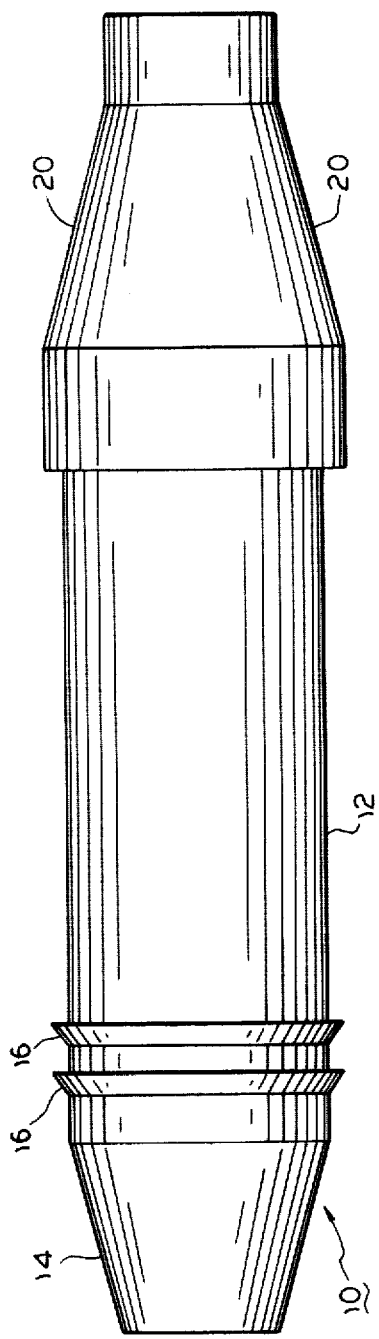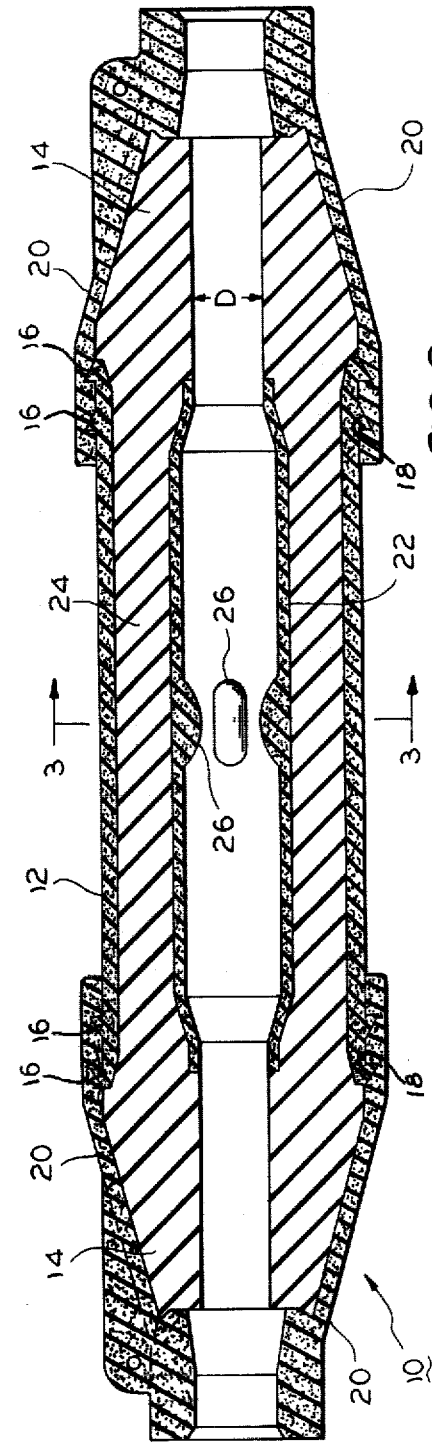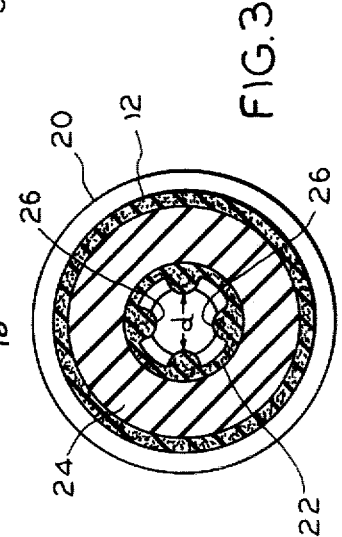

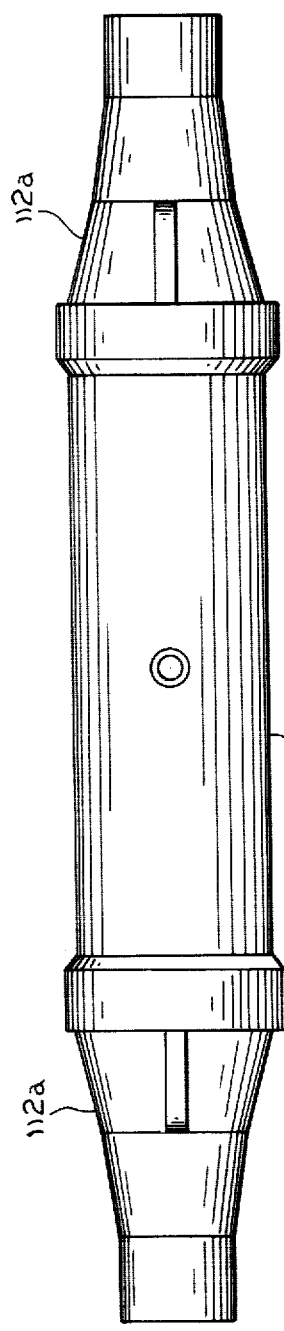
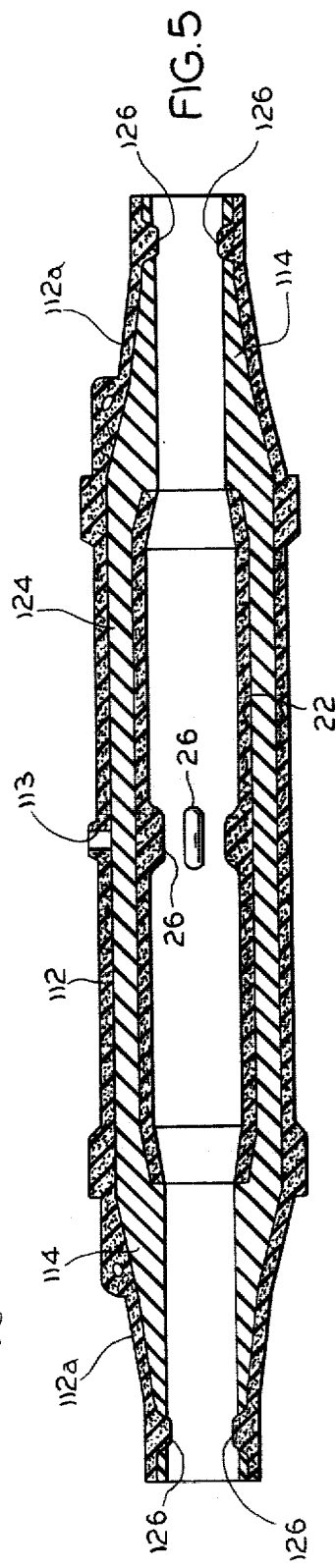
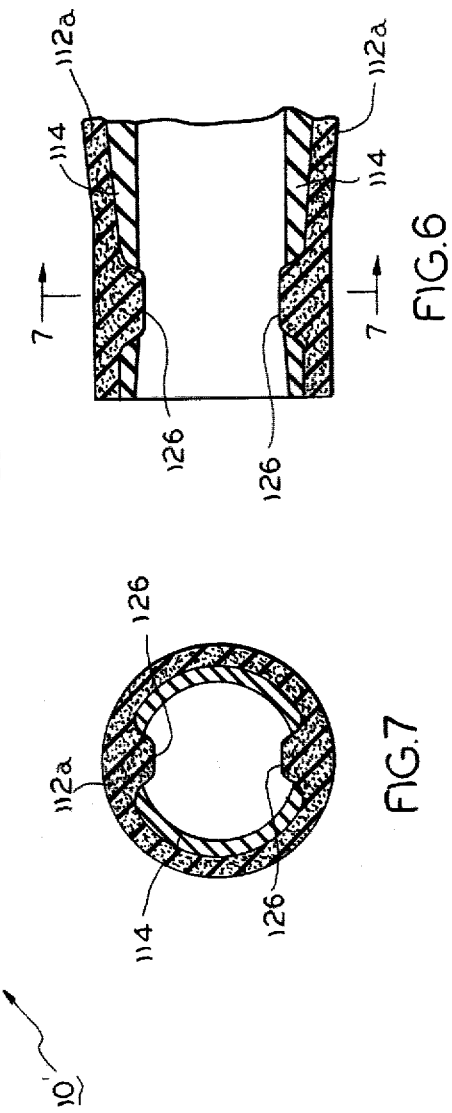
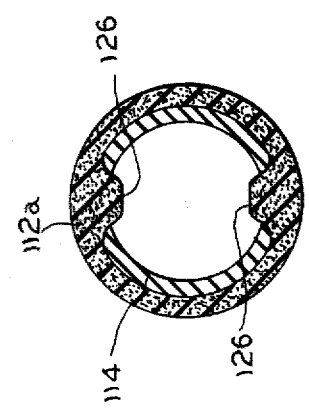

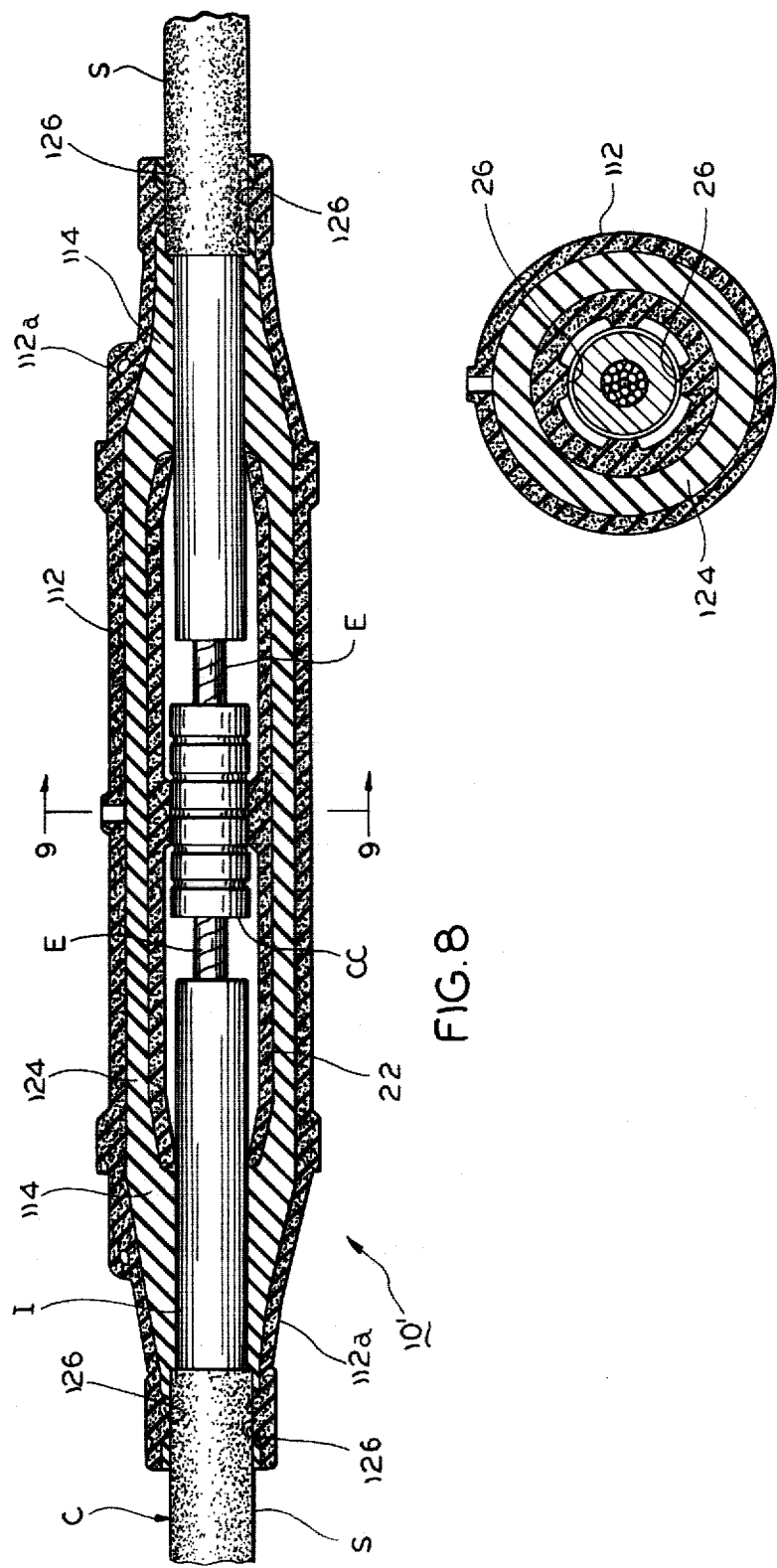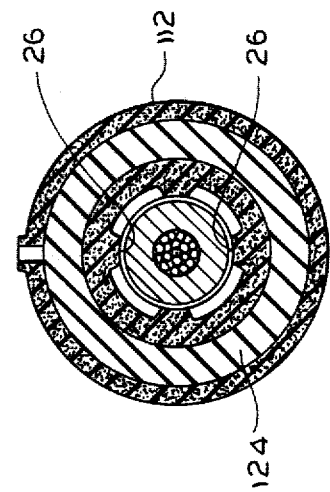

CABLE CONNECTOR

BACKGROUND OF THE INVENTION

This invention relates to a splice connector for connecting adjacent ends of primary distribution system cables and, more particularly, a unitary splice body connector including means for facilitating the installation of the cables and a metallic crimp connector through the body of the splice connector.

Unitary insulated splice body connectors for sealing and insulating the joined ends of power distribution cables are known and have been widely used in the art. These devices comprise a unitary insulating splice body which includes an electrically conductive insert sleeve of resilient elastomeric material embedded within a sleeve of resilient elastomeric insulating material with an axially extending opening through the insulating sleeve having a diameter smaller than the diameter of the exposed solid insulation of the power distribution cables. The voltage gradient across the connection is reduced to a minimum by providing the conductive insert sleeve with a length sufficient to enclose the metallic crimp connector joining the cables and to lap the exposed portions of the cable insulation. The splice connector is mounted on the end of one of the cables prior to connecting the metallic crimp connector to the exposed conductors. The splice connector is then moved over the metallic crimp connector with the conductive insert sleeve lapping the exposed cable insulation of each of the cables.

Since the metallic crimp connector and the exposed cables ends must engage the conductive insert sleeve to be effective, the diameter of the conductive insert sleeve is significantly smaller than the cables or metallic crimp connectors being installed. It has been found that it is difficult to move the splice body over the connected cables due to this restriction and the frictional force which must be overcome to push or pull the metallic crimp connector through the orifice or opening of the splice body.

These and other disadvantages are overcome by the present invention wherein means are provided on the radially inner surface of the conductive insert sleeve to reduce the frictional force necessary to translate the cables and metallic crimp connector through the opening or orifice.

SUMMARY OF THE INVENTION

Briefly, a splice connector for splicing adjacent ends of primary distribution system cables is provided. The connector includes a unitary splice body assembly of molded elastomeric material including a generally tubular longitudinal portion for receiving the cable ends from opposite sides thereof. The assembly includes a semiconductive inner sleeve for surrounding the connection between the cable ends in conductive relationship therewith and the assembly further includes a substantially continuous outer jacket of semiconductive material having an insulated portion separating the inner sleeve and the outer jacket and engaging insulated portions of the cable ends. The central inner portion of the sleeve includes at least one circumferentially arcuately extending and radially inwardly directed protuberance for yieldably engaging the electrically conductive connection of the cable ends in an electrically conductive relationship therewith.

BRIEF DESCRIPTION OF THE DRAWING

The advantages of this invention will become more readily appreciated as the same becomes completely understood by reference to the following detailed description when taken in conjunction with the accompanying drawing wherein:

FIG. 1 is a plan view of a splice body connector incorporating the present invention;

FIG. 2 is a cross-sectional view of FIG. 1 illustrating the splice body connector in accordance with the present invention;

FIG. 3 is a cross-sectional view taken along the lines 3—3 of FIG. 2;

FIG. 4 is a plan view of another splice body connector incorporating the present invention;

FIG. 5 is a cross-sectional view of the connector of FIG. 4 illustrating the features of the present invention;

FIG. 6 is an enlarged view of the end portion of the splice connector of FIG. 5;

FIG. 7 is a cross-sectional view taken along the lines 7—7 of FIG. 6;

FIG. 8 is a cross-sectional view of the splice connector in accordance with FIGS. 4–7 shown in conjunction with spliced power distribution cables; and, FIG. 9 is a cross-sectional view taken along the lines 9—9 of FIG. 8.

DETAILED DESCRIPTION

Referring now to FIG. 1 there is shown generally at 10 a unitary splice connector in accordance with the principles of the present invention. Connector 10 includes a generally cylindrical body 12 of molded rubber or elastomeric material the outer jacket portion of which is provided as a semiconductive rubber or elastomeric material. As is well-known in the art, a suitable semiconductive material is provided by mixing an elastomer with conductive material such as lamp-black, graphite or carbon black. Connector 10 includes tapered end portions 14 of insulating rubber or elastomeric material the outer surfaces of which extend axially inwardly from the axially outer one of a pair of ribs 16 of central body 12. As best illustrated in FIG. 2, ribs 16 are adapted to engage a corresponding annular groove 18 of a respective one of a pair of end caps 20 the latter of which are also provided of a semiconductive elastomeric material. Molded or formed within connector 10 is a conductive insert sleeve 22 which extends a given distance along the longitudinal axis of connector 10 and between the end portions 14 of connector 10. Insert sleeve 22 is also preferably provided of a semiconductive elastomeric material. Connector 10 further includes an insulated portion 24 joining end portions 14 and separating sleeve 22 from the semiconductive jacket of body 12.

As best illustrated in FIG. 3, insert sleeve 22 includes a plurality of inwardly directed protuberances 26 which are preferably integrally formed with the body portion of insert sleeve 22. In currently preferred practice four longitudinally elongated, circumferentially arcuately extending, equally spaced and radially inwardly directed protuberances 26 are provided at the generally central portion of sleeve 22. It can be seen that the diameter d of the imaginary circle which includes the radially inwardly end points of the protuberances is significantly less than the inside diameter D of the insulated cable engaging insulated end portions 14 of connector 10 and, more particularly, the outside diameter of the barrel of the metallic crimped connector connecting the cable ends.

It should be noted that protuberances 26 are yieldable such that they readily can be distorted to conform to and engage the circumference of the cable and more particularly the circumference of the metallic crimped connector connecting the exposed portions of the cable. It will be appreciated by those skilled in the art that by providing protuberances 26, as hereinbefore described, the effective size of the restriction of insert sleeve 22 is significantly increased and the frictional forces of installation are substantially reduced. The reduction of forces is achieved by effectively opening or segmenting the orifice thereby enlarging the effective size of the orifice. Further, since the contact areas of the radially inwardly facing surfaces of protuberances 26 of insert 22, with respect to the cables and the metallic crimped connector, are significantly reduced, the frictional forces which must be overcome during the cable installation are also correspondingly reduced. The reduced contact surface area along with the distortion of the protuberances of the orifice effectively opens the restriction while nevertheless providing the required engagement and electrical contact between the semiconductive insert sleeve 22 and the metallic crimped connector.

Referring now to FIGS. 4 and 5 there are shown plan and cross-sectional views of an alternate embodiment of the present invention. Connector 10' of FIGS. 4 and 5 differs from that of connector 10 of the previous drawing figures in that separate semiconductive end caps are not provided and the unitary splice connector 10' includes extended, integral semiconductive jackets on the end portions thereof which provide essentially the same function as the end caps 20 of connector 10 of the previous drawing figures. That is, body 112 of connector 10' of FIGS. 4 and 5 is provided of a semiconductive elastomeric material as previously described which includes end portions 112a which overlie the tapered insulating end portions 114 of connector 10'. The body 112 of connector 10' further includes a sprue hole 113 which facilitates injecting insulating material into connector body 112 during the manufacturing operation to provide insulating portion 124 which separates conductive insert sleeve 22 and the semiconductive jacket of body 112. The end portions 112a are further provided with elongated, circumferentially extended and radially inwardly directed protuberances 126 which are preferably provided as a pair along a diameter of the central opening of end portions 114. Protuberances 126 project through the insulating material 124 for engagement with the conductive jacket of the associated cable to provide electrical continuity between the semiconductive jacket of body 112 and the conductive shield or outer jacket of the cable. This structure provides a further advantage during the molding operation when semiconductive insert sleeve 22 and body 112 are coaxially disposed about a molding mandrel and the insulating material which forms insulating portion 124 is injected through sprue hole 113. That is, it has been found that once the molding and insulation injection steps are completed, the completed assembly readily can be removed from the molding mandrel because the frictional forces between protuberances 126 and the central core of the mandrel are minimized as the effective diameter of the central opening of end portions 114 is increased. That is, protuberances 126 function in a manner similar to the function of protuberances 26 with respect to the power distribution cable at the time of installation.

It will be appreciated by those skilled in the art that protuberances 26 and 126, in accordance with the present invention, may take any one of a number of geometric configurations such as, for example, elongated fin-like members, ribs, ridges and grooves, corrugations, and the like.

Referring now to FIGS. 8 and 9 there are shown cross-sectional views of connector 10' of FIGS. 4-7 shown in conjunction with spliced power distribution system cables C. The cable connection is provided by means of a metallic crimped connector CC which is crimped about the exposed ends E of cables C after connector 10' is mounted or slid over one of the adjacent confronting cable ends. Once the connector CC is crimped about the exposed ends E of the cables, connector 10' is slid back toward and over the crimped connection until it is positioned as shown in FIG. 8. It can be seen that insulating portion 124 engages the insulated portions I of the cable ends as do the end portions of semiconductive insert sleeve 22. It can also be seen that protuberances 126 engage underlying semiconductive shielded portions S of cables C in a stretched sealing relationship therewith.

What has been taught, then, is a unitary splice connector facilitating, notably, a substantial reduction in the forces needed to install the connector body onto the cables both prior to and after the crimping operation, and the removal of the connector body from the molding mandrel during manufacture. The form of the invention illustrated and described herein is but a preferred embodiment of these teachings in the form currently preferred for manufacture. It is shown as an illustration of the inventive concepts, rather than by way of limitation, and it is pointed out that various modifications and alterations may be indulged in within the scope of the appended claims. While the invention has been described with reference to a splice connector, it will also be appreciated by those skilled in the art that the invention also can be utilized and incorporated in other cable connector devices such as an elbow cable terminator.

What is claimed is:

1. A splice connector for splicing adjacent ends of insulated and shielded primary distribution system cables comprising: a unitary splice body assembly of molded elastomeric material including a generally tubular longitudinal portion for receiving the cable ends from opposite sides thereof, said assembly including a semiconductive inner sleeve for surrounding the connection between said cable ends in conductive relationship therewith, said assembly including a substantially continuous outer jacket of semiconductive material and an insulated portion separating said inner sleeve and said outer jacket, said insulated portion of said assembly being adapted for engaging insulated portions of said cable ends, the central inner portion of said inner sleeve including at least one circumferentially arcuately extending and radially inwardly directed protuberance for yieldably engaging the electrically conductive connection of said cable ends in electrically conductive relationship therewith, and the end portions of said continuous outer jacket each including at least one circumferentially arcuately extending and radially inwardly directed protuberance extending through said insulated portion for respectively yieldably and conductively engaging outer conductive jacket portions of said cable ends.

2. A splice connector for splicing adjacent ends of insulated and shielded primary distribution system cables comprising: a unitary splice body assembly of molded elastomeric material including a generally tubular longitudinal portion for receiving the cable ends from opposite sides thereof, said assembly including a semiconductive inner sleeve for surrounding the connection between said cable ends in conductive relationship therewith, said assembly including a substantially continuous outer jacket of semiconductive material and an insulated portion separating said inner sleeve and said outer jacket, said insulated portion of said assembly being adapted for engaging insulated portions of said cable ends, the central inner portion of said inner sleeve including means for engaging the electrically conductive connection of said cable ends in electrically conductive relationship therewith, and the end portions of said continuous outer jacket each including at least one circumferentially arcuately extending and radially inwardly directed protuberance extending through said insulated portion for respectively yieldably and conductively engaging outer conductive jacket portions of said cable ends.

3. A cable connector for terminating the end of an insulated and shielded primary distribution system cable comprising: a unitary body assembly of molded elastomeric material including a generally tubular longitudinal portion for receiving the cable end from one side thereof, said assembly including a semiconductive inner sleeve for surrounding the terminated connection of said cable end in conductive relationship therewith, said assembly including a substantially continuous outer jacket of semiconductive material and an insulated portion separating said inner sleeve and said outer jacket, said insulated portion of said assembly being adapted for engaging the insulated portion of said cable end, and the end portion of said continuous outer jacket including at least one circumferentially arcuately extending and radially inwardly directed protuberance extending through said insulated portion for yieldably and conductively engaging an outer conductive jacket portion of said cable end.

* * * * *